United States Patent [19]

Roth et al.

[11] 4,202,367
[45] May 13, 1980

[54] CIRCUIT ARRANGEMENT FOR REGULATING THE LEVEL OF LIQUID IN VESSELS

[75] Inventors: Zdenek Roth, Pilsen; Josef Altmann, Domazlice, both of Czechoslovakia

[73] Assignee: Skoda, oborovy podnik, Pilsen, Czechoslovakia

[21] Appl. No.: 960,020

[22] Filed: Nov. 13, 1978

[30] Foreign Application Priority Data

Nov. 24, 1977 [CS] Czechoslovakia .................. 7773/77

[51] Int. Cl.$^2$ .............................................. G05D 9/04
[52] U.S. Cl. .................................... 137/187; 137/393; 137/396
[58] Field of Search ............... 137/187, 188, 386, 393, 137/396, 395, 204

[56] References Cited

U.S. PATENT DOCUMENTS

| | | | |
|---|---|---|---|
| 3,269,404 | 8/1960 | Lebow | 137/393 X |
| 3,526,276 | 9/1970 | Bennett | 137/188 X |
| 3,590,843 | 7/1971 | Meyer | 137/393 X |

Primary Examiner—Alan Cohan

[57] ABSTRACT

There is disclosed a circuit arrangement for regulating the level of a liquid in vessels. The arrangement according to this invention comprises a draining vessel with a draining conduit, a fluid level pick-up device, a compensation pick-up device, and a working element. The main feature of the circuit arrangement is that the compensation pick-up device is connected to the draining vessel above the regulated liquid level and the upper part of the fluid level pick-up device is also connected to the draining conduit above the regulated liquid level. The lower part of the fluid level pick-up device is connected below the regulated level equally to the draining conduit. The transmission nozzles of both the compensation fluid pick-up device and of the fluid level pick-up device are connected to the feeding conduit, the receiving nozzle of the compensating fluid pick-up device is connected to a lower space of the working element via a compensation conduit, whereas the receiving nozzle of the fluid level pick-up device is connected with the upper space of the working element via a signal conduit.

4 Claims, 1 Drawing Figure

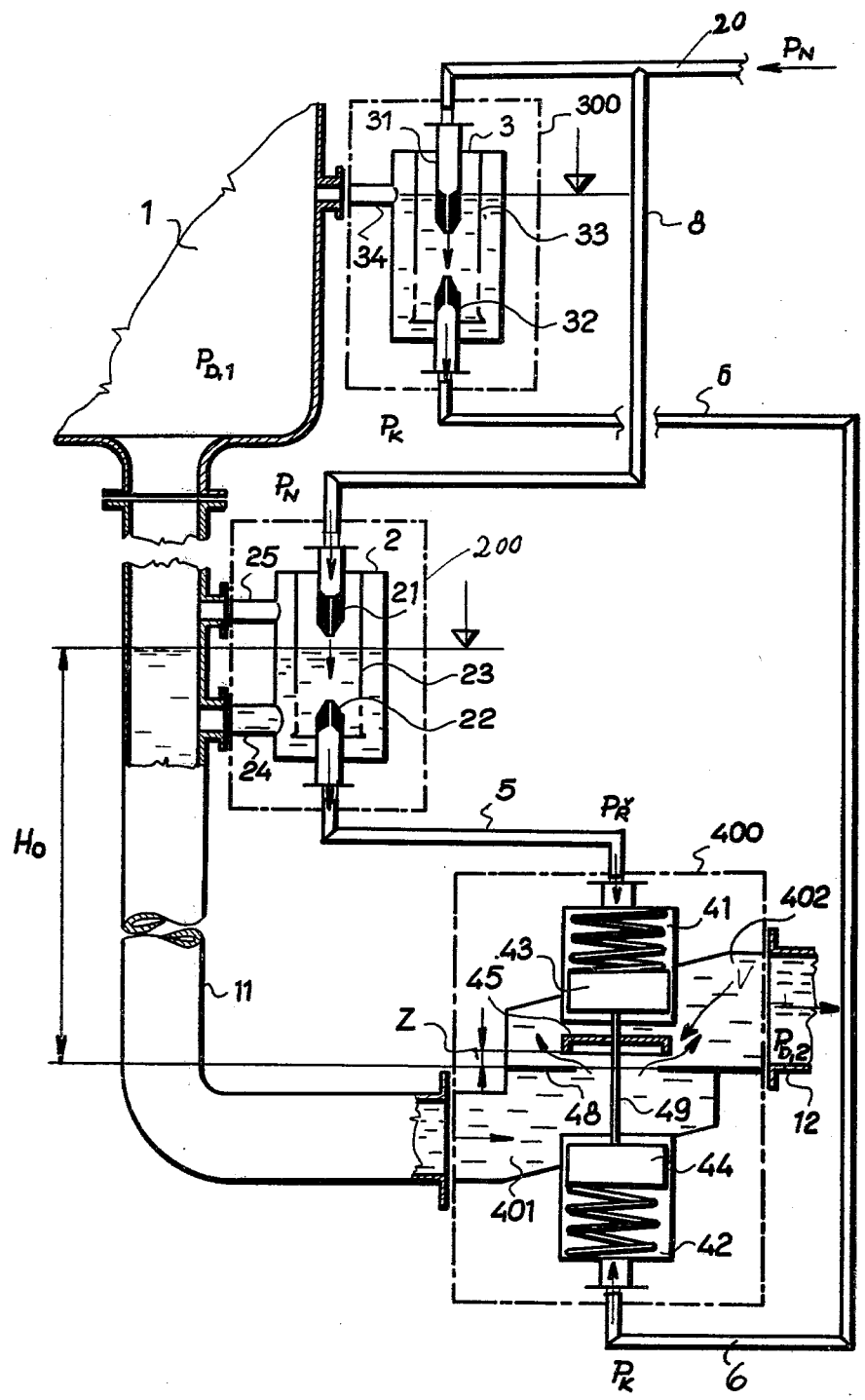

CIRCUIT ARRANGEMENT FOR REGULATING THE LEVEL OF LIQUID IN VESSELS

BACKGROUND OF THE INVENTION

This invention relates to a circuit arrangement for regulating the level of liquid in vessels; such arrangement is particularly suitable for regulating the level of condensate in regeneration heat transmitters and condensers of steam turbines.

The regulation of the level of liquids in vessels is now accomplished by several different methods. According to recently used methods, the difference of the hydrostatic height of the liquid in a vertical part of a draining conduit and of a constant hydrostatic height of the liquid in a compensation conduit, for instance of a condenser of a steam turbine, is utilized as a signal of the liquid level so that the difference of pressure levels of both said liquid columns controls the motion of a working element in the draining conduit. The motion of the operating element determines the amount of the drained liquid, and thus also its level.

A drawback of these arrangements employing the passage of the condensate in a regulating loop, utilizing a signal of the liquid level provided by a difference of hydrostatic heights, is the requirement that the vertical part of the draining conduit by its length must generate a sufficient pressure difference for the control of the working element within the whole range of output parameters.

SUMMARY OF THE INVENTION

It is an object of this invention to eliminate to a high degree the above mentioned drawbacks of actual circuit arrangements for regulating the liquid level in vessels and to provide an arrangement securing a sufficient reduction of passage of liquid within the whole range of pressure and output parameters by simple means. The arrangement according to this invention comprises a working vessel with a draining conduit, a fluid level pick-up device, a compensation pick-up device and a working element. The main feature of the circuit arrangement is that the compensation pick-up device is connected to the draining vessel above the regulated liquid level and the upper part of the fluid level pick-up device is also connected to the draining conduit above the regulated liquid level. The lower part of the fluid level pick-up device is connected below the regulated level equally to the draining conduit. The transmission nozzles of both the compensation fluid pick-up device and of the fluid level pick-up device are connected to the feeding conduit, the receiving nozzle of the compensating fluid pick-up device is connected to a lower space of the working element via a compensation conduit, whereas the receiving nozzle of the fluid level pick-up device is connected with the upper space of the working element via a signal conduit.

The advantage of the circuit arrangement according to this invention is its simplicity and the property of self adjustment; further, the arrangement secures a sufficient reduction of the passage of the liquid througout the whole range of pressure and output parameters. Another advantage of the circuit arrangement according to this invention is the independence of the operation of the regulating loop of pressure variations in the draining vessel even behind the working element of the regulating loop. When the arrangement of the invention is used in the regeneration system of a steam turbine, it is very advantageous that the liquid content in the arrangement can be reduced to only its content in the draining conduit.

DESCRIPTION OF DRAWING

An examplary embodiment of a circuit arrangement according to this invention is illustrated in the single FIGURE of the accompanying drawing, wherein a regulating loop of the level of condensate of a regeneration heat transmitter of a steam turbine is shown.

DESCRIPTION OF PREFERRED EMBODIMENT

The main elements of the illustrative circuit arrangement in accordance with the invention are a draining vessel 1, which in this instance is at the bottom of a regeneration heat transmitter, a fluid level pick-up device 200, a compensation fluid pick-up device 300, and a working element 400. The chamber 3 of the compensation fluid pick-up device 300 is connected to the draining vessel at a point above the bottom of the latter by a connecting conduit member 34. A draining conduit 11 for the condensate is connected to the lower part of the draining vessel 1. The lower end of the draining conduit 11 terminates in the inlet space 401 of the working element 400 of the regulating loop. The chamber 2 of the fluid level pick-up device 200 is connected to the vertical part of the condensate draining conduit 11 below draining vessel 1 by means of an upper connecting conduit member 25 and by means of a lower connecting conduit member 24. The fluid level pick-up device 200 is formed by a chamber 2, wherein an upper transmitting nozzle 21, a lower receiving nozzle 22 and a cylindrical screening mantle 23 are mutually coaxially fixed. The lower end of the receiving nozzle 22 of the fluid level pick-up device 200 is connected by a signal conduit 5 of a control pressure signal $P_{\tilde{R}}$ with the upper cylindrical space 41 of the working element 400.

The compensation fluid pick-up device 300 is formed by a chamber 3, wherein an upper transmission nozzle 31, a lower receiving nozzle 32 and a screening mantle 33 are mutually coaxially fixed. The lower end of the receiving nozzle 32 of the compensation fluid pick-up device 300 is connected by a compensation conduit 6 of the compensation pressure signal $P_K$ with the lower cylindrical space 42 of the working element 400.

The working element 400 comprises the above-mentioned inlet space 401 and a release or discharge space 402 which are mutually separated by a fixed, apertured, horizontal adjusting partition 48, and an upper space 41 and a lower space 42, wherein elastic mobile elements 43, 44 respectively, are situated, mutually connected by a vertical connecting shaft 49, provided with a regulating disc 45, the apertured partition 48, and the disc 45 constituting a valve V.

The operation of the circuit arrangement according to this invention is based on a fluid picking-up of the level in the vertical part of the condensate draining conduit 11 by the fluid level pick-up device 200 with a simultaneous compensation of pressure disturbances in the space of the draining vessel 1 by their parallel picking-up both by the fluid level pick-up device 200 and by the compensating pick-up device 300. The condensate originating in the draining vessel 1 flows from it into the draining conduit 11 for the condensate, in the vertical part of which under stabilized conditions a column of condensate of the height $H_o$ of the level is built up. The condensate passes from conduit 11 into and through the inlet space 401 and upwardly through the aperture in the partition 48 when the regulating disc 45 is raised from partition 48 as shown. The height Z of the regulating disc 45 above the partition 48 determines the throughflow cross-section of valve V. Condensate passes radially through valve V when it is open, as shown; this causes the degree of opening of valve V, that is, the value of Z, to be independent of variations of pressure levels upstream of and downstream of the working element 400. The condensate flowing into the release space 402 is thereafter directed through a connecting conduit 12 at a pressure $P_{D,2}$ to a further stage (not shown) of the regeneration cascade.

The condensate in conduit 11 is shown as having a height $H_o$. The condensate in conduit 11 passes via the lower connecting conduit member 24 to the chamber 2 of the fluid level pick-up device 200; chamber 2 is connected via the upper connecting conduit member 25 with the space above the condensate level in conduit 11. The transmitting nozzle 21 of the fluid level pick-up device 200 is connected with a source of constant pressure liquid at a pressure $P_N$ via connected feeding conduits 20 and 8, the pressure level $P_N$ being higher than the pressure level $P_{D,1}$ of the steam medium in the draining vessel 1. The variations in liquid level in chamber 2 of fluid level pick-up device 200 interacting with transmitting nozzle 21 cause the speed of liquid flowing into chamber 2 through nozzle 21 to vary in accordance with the variable pressure difference $P_N - P_{D,1}$. By interaction with the layer of liquid determined by the distance between the upper end of the receiving nozzle 22 and the liquid level in the chamber 2, the liquid stream passing from the transmitting nozzle 21 of the fluid level pick-up device 200 is controlled and held at a depth at which the pressure of the fluid flowing into and through the receiving nozzle 22 of the fluid level pick-up device 200 is reduced to the pressure of the control pressure signal $P_{\check{R}}$; the speed of flow of the liquid stream at the mouth of receiving nozzle 22 bears a fixed relationship to the pressure signal $P_{\check{R}}$.

The control pressure signal $P_R$ is transmitted via a signal conduit 5 connected to nozzle 22 to the upper space 41 of the working element 400. The fluid compensation pick-up device 300 connected via the connecting conduit member 34 with the space within the draining vessel 2 operates with a constantly submerged transmitting nozzle 31 and a receiving nozzle 32, and generates in dependence on a change of the pressure $P_{D,1}$ in the draining vessel 1 a reference compensating pressure signal $P_K$, which is transmitted to the lower space 42 of the working element 400 via a compensation conduit 6 of the compensating pressure signal $P_K$.

The height Z of the regulating disc 45 of valve V is proportional to the resulting force of forces due to pressures $P_{\check{R}}$ and $P_K$ and due to spring constants of elastically mobile elements 43, 44. A stabilized condition of the circuit corresponds to a condition, where the condensate column of a height $H_o$ and the height Z of the regulating disc 45 of valve V do not change. The dynamics of this circuit arrangement is adequate to the response of this circuit to a variation of the throughgoing amount of liquid, caused, for instance, by a change of conditions of condensation in the space of the draining vessel 1.

If the amount of condensate leaving draining vessel 1 is increased, the capacity represented by the draining conduit 11 of the condensate starts to be reached, and the height $H_o$ of the condensate column of the vertical part of conduit 11 increases. This change is transmitted via the lower connecting conduit member 24 to the chamber 2 of the fluid level pick-up device 200 and causes an increase of the throttling effect on the liquid stream leaving the transmitting nozzle 21 of the fluid level pick-up device 200. Thus the pressure level of the control pressure signal $P_{\check{R}}$ is lowered at the mouth of the receiving nozzle 22 of the fluid level pick-up device 200, and this change is transmitted via the signal conduit 5 of the control pressure signal $P_{\check{R}}$ to the upper space 41 of the working element 400. By the reduction of pressure in this space the equilibrium of forces is disturbed and the resulting force, directed upwards, starts to increase the height Z of the regulating disc 45 of valve V. With the increase of the height Z of the regulating disc 45, the throughflow cross-section between regulating disc 45 and the fixed partition 48 increases, the flow of the condensate from the draining conduit 11 of the condensate is also increased, and the speed of growth of the height $H_o$ of the condensate column in conduit 11 is reduced until a stabilized condition of the circuit arrangement is again achieved.

Although the invention is illustrated and described with reference to one preferred embodiment thereof, it is to be expressly understood that it is in no way limited to the disclosure of suc such a preferred embodiment, but is capable of numerous modifications within the scope of the appended claims.

What is claimed is:

1. A circuit arrangement for the regulation of the liquid level in vessels, comprising in combination a draining vessel with a draining conduit connected thereto, a fluid level pick-up device, a compensating pick-up device, a working element, a feeding conduit from a source of a pressure liquid, a signal conduit and a compensation conduit, each of the fluid level pick-up device and the compensation pick-up device comprising a chamber with an upper part and a lower part, an upper transmission nozzle with its mouth directed downwards fixed in the upper part of said chamber, and a lower receiving nozzle with its mouth directed upwards fixed in the lower part of said chamber, the mouths of the upper and lower nozzles being spaced vertically from each other, the working element comprising an upper space and a lower space, a passage for liquid between said upper and lower space, valve means for the adjustment of the resistance against the passage of liquid through the working element in dependence upon the respective pressures acting on the upper space and the lower space thereof, means connecting the upper space of the fluid level pick-up device to the draining conduit above the regulated liquid level therein, means connecting the lower space of the fluid level pick-up to the draining conduit below the regulated liquid level therein, means connecting the upper space of the compensation pick-up device to the draining vessel above the level of the regulated liquid in the draining vessel, conduit means connecting the transmission nozzles of both the fluid level pick-up device and of the fluid compensation pick-up device to a source of pressure liquid, the compensation conduit connecting the receiving nozzle of the compensation pick-up device to the lower space of the working element, and the signal conduit connecting the receiving nozzle of the fluid level pick-up device to the upper space of the working element.

2. The circuit arrangement according to claim 1, wherein the source of pressure liquid supplies liquid under constant pressure.

3. The circuit arrangement according to claim 2, wherein the pressure of the liquid supplied by the source of pressure liquid exceeds the pressure of the fluid medium in the draining vessel.

4. The circuit arrangement according to claim 3, wherein the lower end of the transmission nozzle in the compensation fluid pick-up device is always immersed in liquid in said device.

* * * * *